United States Patent
Tzoref-Brill et al.

(10) Patent No.: US 8,656,341 B2
(45) Date of Patent: Feb. 18, 2014

(54) BDD-BASED FUNCTIONAL COVERAGE ANALYSIS

(75) Inventors: Rachel Tzoref-Brill, Haifa (IL); Itai Segall, Tel-Aviv (IL); Tatyana Veksler, Zichron Yaakov (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/360,811

(22) Filed: Jan. 30, 2012

(65) Prior Publication Data

US 2013/0103983 A1 Apr. 25, 2013

Related U.S. Application Data

(63) Continuation-in-part of application No. 13/163,700, filed on Jun. 19, 2011.

(51) Int. Cl.
*G06F 17/50* (2006.01)

(52) U.S. Cl.
USPC ............................................ 716/136; 716/106

(58) Field of Classification Search
USPC .................................. 716/100–108, 136–138
See application file for complete search history.

(56) References Cited

U.S. PATENT DOCUMENTS

2008/0092098 A1* 4/2008 Jacobi et al. ...................... 716/5

* cited by examiner

*Primary Examiner* — Paul Dinh
(74) *Attorney, Agent, or Firm* — Ziv Glazberg

(57) ABSTRACT

Obtaining a functional coverage model of a System Under Test (SUT) defining all functional coverage tasks of the SUT, wherein the functional coverage model defining a test-space with respect to functional attributes; obtaining a set of covered functional coverage tasks; encoding a covered Binary Decision Diagram (BDD) to represent the set of covered functional coverage tasks within the test-space; and manipulating the covered BDD to identify one or more coverage holes, wherein a coverage hole defines a set of coverage tasks in the test-space, all having a same combination of values to a subset of the functional attributes, that are not covered by the set of covered functional coverage task.

20 Claims, 3 Drawing Sheets

BDD-BASED FUNCTIONAL COVERAGE ANALYSIS

CROSS-REFERENCE TO RELATED APPLICATIONS

This application is a continuation-in-part application and claims the benefit of U.S. non-provisional application Ser. No. 13/163,700 filed Jun. 19, 2011, which is hereby incorporated by reference in its entirety.

TECHNICAL FIELD

The present disclosure relates to functional coverage in general, and to analyzing functional coverage of test-space using Binary Decision Diagram (BDD), in particular.

BACKGROUND

Computerized devices control almost every aspect of our life—from writing documents to controlling traffic lights. However, computerized devices are bug-prone, and thus require a testing phase in which the bugs should be discovered. The testing phase is considered one of the most difficult tasks in designing a computerized device. The cost of not discovering a bug may be enormous, as the consequences of the bug may be disastrous. For example, a bug may cause the injury of a person relying on the designated behavior of the computerized device. Additionally, a bug in hardware or firmware may be expensive to fix, as patching it requires call-back of the computerized device. Hence, many developers of computerized devices invest a substantial portion of the development cycle to discover erroneous behaviors of the computerized device.

During the testing phase, a sample of all possible behaviors of the computerized device, also referred to as a System Under Test (SUT), is inspected. Dynamic verification which stimulates the SUT and is used to identify bugs may be utilized. Generally, Dynamic verification is associated with the execution of the SUT (or simulation thereof), and dynamically checks its behavior. As opposed to static verification measures which analyze the SUT without executing it, such as model checking, formal verification, static code analysis, or the like. Dynamic verification may be any of the following: test planning, test-generation, SUT simulation, testing of the SUT, coverage analysis, or the like.

Coverage tools for checking software provide a measure of how well the software being evaluated has been exercised during testing and thereby give a level of assurance that the software is of high quality.

There are a number of types of coverage known in the art, such as statement coverage, line coverage, condition coverage, path coverage, method coverage, and the like. One additional coverage method is functional coverage. Functional coverage is designed to measure amount, portion or a similar metric of tests that examined predetermined functional behaviors. Once functional coverage is measured, quality assurance (QA) personnel may design additional tests to examine untested behaviors.

A functional coverage is measured with respect to a functional coverage model. The functional coverage model defines a triplet: functional attributes, a domain for each functional attribute, and a set of restrictions. The functional attributes may be any attribute of the SUT, such as for example a type of web browser being used, an underlying Operating System, a number of threads operating, whether the output was printed. The domains may define for each attribute a set of possible values. For example, the web browser may be Microsoft® Internet Explorer®, Google® Chrome®, or Mozilla Firefox™. Similarly, the operating system may be Microsoft® Windows®, or Linux™. The cross-product of the different combinations of the attributes defines a functional coverage test-space. The test-space comprises a set of coverage tasks, each representing functional requirements to be tested: one requirement per functional attribute, and the requirement is that the functional attribute will exhibit the behavior of the value of the coverage task. The coverage task may be seen as a tuple of one value per attribute. In a functional coverage model in which there are three functional attributes, one having three possible values, the second having two possible values, and the third having ten possible values, the cross-product test-space comprises sixty (60) coverage tasks.

The functional coverage model may further comprise a set of restrictions defining a series of values of different attributes that may not appear together. For example, consider a functional coverage defining two attributes: ACTION and USER. The ACTION attribute may be each of the following values: RETRIEVE, STORE, and MODIFY PERMISSION. The USER attribute may be each of the following values: ADMIN, USER, GUEST. In some cases, a guest user cannot modify permission. A restriction may be defined to indicate that the couple (GUEST, MODIFY PERMISSION) is not a valid couple. The fact that a trace does not comprise an entry covering a coverage task that includes the couple does not affect the functional coverage. In other words, all possible coverage tasks—which together form the maximal possible coverage with respect to a functional coverage—do not include any coverage task that comprises the restricted couple. It will be understood that restrictions may be defined with respect to a combination of values of different attributes, and not necessarily with respect to a complete tuple of values. Furthermore, the restriction may be any constraint on combination of values, which may be represented using a Boolean formula over the functional attributes and associated values.

BRIEF SUMMARY

One exemplary embodiment of the disclosed subject matter is a computer-implemented method, the method performed by a processor, the method comprising: obtaining a functional coverage model of a System Under Test (SUT) defining all functional coverage tasks of the SUT, wherein the functional coverage model defining a test-space with respect to functional attributes; obtaining a set of covered functional coverage tasks; encoding a covered Binary Decision Diagram (BDD) to represent the set of covered functional coverage tasks within the test-space; and manipulating the covered BDD to identify one or more coverage holes, wherein a coverage hole defines a set of coverage tasks in the test-space, all having a same combination of values to a subset of the functional attributes, that are not covered by the set of covered functional coverage task.

Another exemplary embodiment of the disclosed subject matter is a computerized apparatus having a computerized memory and a processor, the processor being arranged to: obtain a functional coverage model of a System Under Test (SUT) defining all functional coverage tasks of the SUT, wherein the functional coverage model defining a test-space with respect to functional attributes; obtain a set of covered functional coverage tasks; encode a covered Binary Decision Diagram (BDD) to represent the set of covered functional coverage tasks within the test-space; and manipulate the covered BDD to identify one or more coverage holes, wherein a coverage hole defines a set of coverage tasks in the test-space, all having a same combination of values to a subset of the functional attributes, that are not covered by the set of covered functional coverage task.

Yet another exemplary embodiment of the disclosed subject matter is a computer program product, the computer program product comprising: a non-transitory computer readable medium, in which computer instructions are stored, which instructions, when read by a computer, cause the computer to: obtain a functional coverage model of a System Under Test (SUT) defining all functional coverage tasks of the SUT, wherein the functional coverage model defining a test-space with respect to functional attributes; obtain a set of covered functional coverage tasks; encode a covered Binary Decision Diagram (BDD) to represent the set of covered functional coverage tasks within the test-space; and manipulate the covered BDD to identify one or more coverage holes, wherein a coverage hole defines a set of coverage tasks in the test-space, all having a same combination of values to a subset of the functional attributes, that are not covered by the set of covered functional coverage task.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
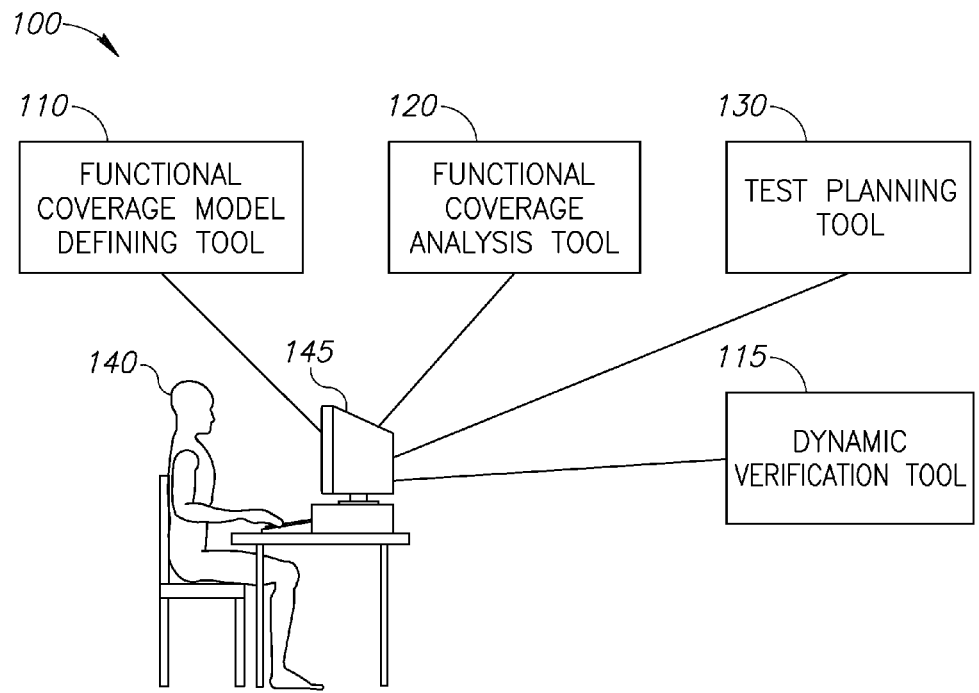
FIG. 1 shows a schematic illustration of a computerized environment, in accordance with some embodiments of the disclosed subject matter.

The disclosed subject matter is described below with reference to flowchart illustrations and/or block diagrams of methods, apparatus (systems) and computer program products according to embodiments of the subject matter. It will be understood that some blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to represent the functional coverage test-space, which potentially contains a substantially large number of potential coverage tasks, such as $2^{20}$, $2^{30}$ and the like.

Another technical problem is to assist a user in defining the functional coverage test-space and to plan testing of the functional coverage test-space.

Yet another technical problem is to identify functional coverage holes in coverage. A coverage hole is a set of functional attributes that are not covered by the tests of a SUT and that are not subsumed by other coverage holes. Given which value combinations each test covers, a functional coverage hole is a combination of values for a subset of the variables, that is not covered by any of the given tests. The smaller the number of variables participating in the hole, the larger is the hole, because usually it means that it appears in more coverage tasks of the coverage space.

In some exemplary embodiments, a hole contains a smaller hole, if its variable values are contained in the values of the smaller hole. For example: The hole: ProductAvailability='NoSuchProduct' means that no test covers the case when the product is undefined. The hole: ProductAvailability='NoSuchProduct', Payment='Credit' is a smaller hole than the previous hole, which refers to the case where both the product is undefined, and the payment method is credit card. The smaller hole is contained in the larger hole, as all cases where the product is undefined and the payment is by credit card are contained in all the cases where the product is undefined. On the other hand, the hole: ProductAvailability='Available', Payment='Credit' is smaller than the hole ProductAvailability='NoSuchProduct' but is not contained in it.

In some exemplary embodiments, a coverage hole is a characterization of coverage tasks that are not covered and that are not contained in any other hole. Thereby, a set of holes provide concise information regarding which features of the SUT were not covered.

A "dimension" of a hole or of a potential hole is a number of functional attributes that are represented by the hole. For example, the hole ProductAvailability='NoSuchProduct', Payment='Credit' has a dimension of two where the hole ProductAvailability='NoSuchProduct' has a dimension of one.

In some exemplary embodiments, analyzing and presenting functional coverage holes requires detecting all holes up to a given size, that are not contained in any other hole. In general, the higher the dimension, the larger and, therefore, more meaningful the hole it describes. Since a hole of higher dimension is both more informative and more concise than the holes it subsumes, it becomes unnecessary, and in fact redundant, to report on the latter.

One technical solution is to utilize a Binary Decision Diagram (BDD) to symbolically represent the functional coverage test-space. Symbolic representation is much more scalable than an explicit representation of the test-space, and may be useful in representing large sets of data.

Another technical solution is to encode multi-valued domains of functional attributes using n bits, and thus enable utilization of BDDs which are applicable on binary variables.

Yet another technical solution is to analyze the functional coverage test-space by manipulating the BDD. A user defining the model may utilize filtering and projections of the test-space to determine whether the definition is correct and/or sufficient. Filtering and projections may be determined by BDD manipulations.

Yet another technical solution is to determine a set of holes in coverage by manipulating BDDs, thereby efficiently determining the holes in a scalable manner.

Yet another technical solution is to enforce a static ordering of the BDD variables. The order of the BDD variables may have a substantial effect on the size of the BDD data structure. Thus ordering the BDD variables in "good" ordering may be useful in decreasing its size.

One technical effect of utilizing the disclosed subject matter is providing for a scalable method to represent and utilize functional coverage test-spaces. It will be noted that specifically in the software domain, the cross-product test-space may be enormous due to the large number of attributes and/or the sizes of their respective domains. However, additional domains, such as for example the hardware domain, may also comprise a large number of attributes and/or large sized respective domains.

Another technical effect is increasing the capacity of methods that manipulated the functional coverage test-space, both in terms of the size of the models and in terms of the size of the requested interaction levels.

Yet another technical effect is that the disclosed subject matter enables to easily support any restriction that can be represented using a Boolean predicate. Therefore, any types of restrictions on the value combinations may be supported.

Yet another technical effect is increasing capacity, in terms of the size of the functional models that can be handled, the size of the holes that can be detected, and the size of the coverage data that can be handled. In some exemplary embodiments, increased capacity is achieved by detecting at once all holes for a given subset of variables, instead of one by one.

In some exemplary embodiments, test coverage is based on a modeling of the test space using a functional coverage model. The test space can represent inputs, scenarios, configurations, the application's internal state, or any other aspect that we are interested in testing. The functional coverage model may comprise a set of functional attributes, a respective domain of possible values for each functional attribute, and restrictions on the value combinations. The restrictions may be viewed as Boolean expressions defining when value combinations are valid or invalid. For example, in case of a functional model which comprises the functional attributes of Web browser and Operating System, there may be a restriction such as: Operating System=Linux∧Web browser=Internet Explorer. As another example, the restriction may be: Operating System≠Windows∧Web browser=Internet Explorer. Alternatively, a restriction may define that legal combinations are: Operating System=Windows∧Web browser=Internet Explorer. It will be understood that the above are provided as examples only and the restrictions may apply to other functional attributes, a different number thereof, using different logical operations and operators or the like. It will be further noted that, as in these examples, the restriction need not refer to all functional attributes, and may apply only to those functional attributes which are inter-connected.

The set of valid value combinations may define the functional coverage test-space. The functional coverage test-space is the plurality of valid coverage tasks that may be covered by tests. A coverage task may be a functional characterization of an exhibited behavior and/or properties of a test of the SUT. It will be understood that a plurality of different tests may cover the same coverage task. Moreover, the same test may cover a plurality of coverage tasks. In some exemplary embodiments, the functional coverage test-space is defined by the functional coverage model as the Cartesian cross-product of the different values of the functional attributes excluding the coverage tasks which are deemed illegal. Alternatively, the functional coverage test-space may include all coverage tasks which are deemed legal. Other manners in which the functional coverage model may define the functional coverage test-space may be used instead.

With respect to coverage analysis, coverage tasks that are covered by the testing phase may be identified. As an example, the coverage tasks may be identified based on a trace of the SUT during the testing phase. The disclosed subject matter is applicable to Cartesian product models. In the present disclosure "Cartesian cross-product test-space" is a functional test-space associated with the SUT that may be defined by a cross-product of values of functional attributes, and having some combinations thereof excluded therefrom. It will be therefore understood that a functional coverage test-space is a Cartesian cross-product test-space. For simplicity, the disclosure refers to Cartesian cross-product test-space as comprising coverage tasks.

Functional coverage models may not scale well. In case the value combinations of the model are represented explicitly, the model may become very large. Consider a model with 30 variables and 3 values per variable. This defines a model with 3^30 combinations, which requires a large memory capacity. Practically, this model may be too large to be explicitly represented in memory. In addition to representing the model, there are operations that are used during the development of the model, such as viewing projections of the model and extracting various views that help in making sure that the model is consistent and complete. Such operations, when performed with respect to explicit representation and enumeration of the test-space, may encounter the same scalability issue.

The scalability problem may limit the use of coverage analysis in real-life applications.

Thus there is a need to provide for a mechanism to represent efficiently large Cartesian cross-product test-spaces and enable performing operations thereof, in a more scalable manner.

In some exemplary embodiments, a symbolic representation of the functional coverage model may be utilized. The symbolic representation may use a BDD. A BDD is a relatively compact data structure for representing and manipulating Boolean functions. By representing a Boolean function that is associated with whether or not the combination of functional attributes is a member of the functional coverage test-space, the BDD may be utilized to represent the Cartesian cross-product test-space. Thus, the Boolean function is seen as answering the question: is this a valid coverage task in accordance with the functional coverage model?

Instead of representing the set of valid combinations explicitly, a BDD may be built using the restrictions, as is further disclosed hereinbelow. The BDD evaluates to "true"

exactly the set of assignments that represent valid value combinations. In this way the size of the Cartesian cross-product test-space is likely to be significantly reduced, since the worst case is the explicit representation as a truth table representation, and BDDs are usually much smaller than the worst case. Since the size of the BDD highly depends on the variable order, a static order of variables may be determined so as to further reduce the size of the BDD. For example, the order can be determined according to the number of appearances of each variable in the restrictions.

Referring now to FIG. 1, showing a schematic illustration of a computerized environment, in accordance with some embodiments of the disclosed subject matter. A computerized environment 100 may comprise one or more computerized tools.

In some exemplary embodiments, a user 140, such as a developer, a QA staff member, a tester, a designer, a verification engineer or the like, may interact with the computerized environment 100. The user 140 may utilize a Man-Machine Interface (MMI) 145 such as a terminal, a display, a keyboard, an input device or the like.

In some exemplary embodiments, a functional coverage model defining tool 110 may be utilized to define the functional coverage model. In some exemplary embodiments, the user 140 may define the functional attributes, domains and restrictions. In some exemplary embodiments, defining the functional coverage model may be an iterative process in which the user 140 may examine the functional coverage test-space and add or remove restrictions, then examine the test-space again, and so forth. In some exemplary embodiments, a similar tool may be utilized to define a planning test-space. In some exemplary embodiments, the functional coverage model may be adapted to be utilized as a planning test model.

In some exemplary embodiments, a dynamic verification tool 115 may be utilized to test the functionality of the SUT. It will be noted that the SUT may be hardware, firmware, software, combination thereof or any other type of computerized device. The dynamic verification tool 115 may be a simulation-based verification tool, a test-generation platform, or the like. The dynamic verification tool 115 may be operatively coupled to a test planning tool 130 and configured to perform testing in accordance with the test plan. In some exemplary embodiments, the test planning tool 130 may provide the tests for the dynamic verification tool 115 to perform. It will be noted that dynamic verification is a broader concept than testing the SUT, and it further includes test planning, coverage analysis and the like. The dynamic verification tool 115 provides only one aspect of the entire scope of operations that may be performed during dynamic verification, and should not be used to construe the term "dynamic verification" narrowly.

In some exemplary embodiments, a functional coverage analysis tool 120 may be configured to measure functional coverage based on the dynamic verification performed by the dynamic verification tool 115. In some exemplary embodiments, the coverage analysis may be performed with respect to testing of the SUT, whether automatic, semi-automatic, or manual. The functional coverage analysis tool 120 may provide a coverage measurement, such as a portion of the coverage test-space or of the defined test plan, indicative of coverage tasks that were covered during dynamic verification performed by the dynamic verification tool 115. The user 140 may review the coverage measurement and/or the list of covered tasks.

In some exemplary embodiments, the functional coverage analysis tool 120 may determine holes in coverage. Additionally or alternatively, the tool 120 may report to the user 140 the set of identified holes so that the user 140 may inspect the holes and determine whether additional testing is required.

Figure 2:
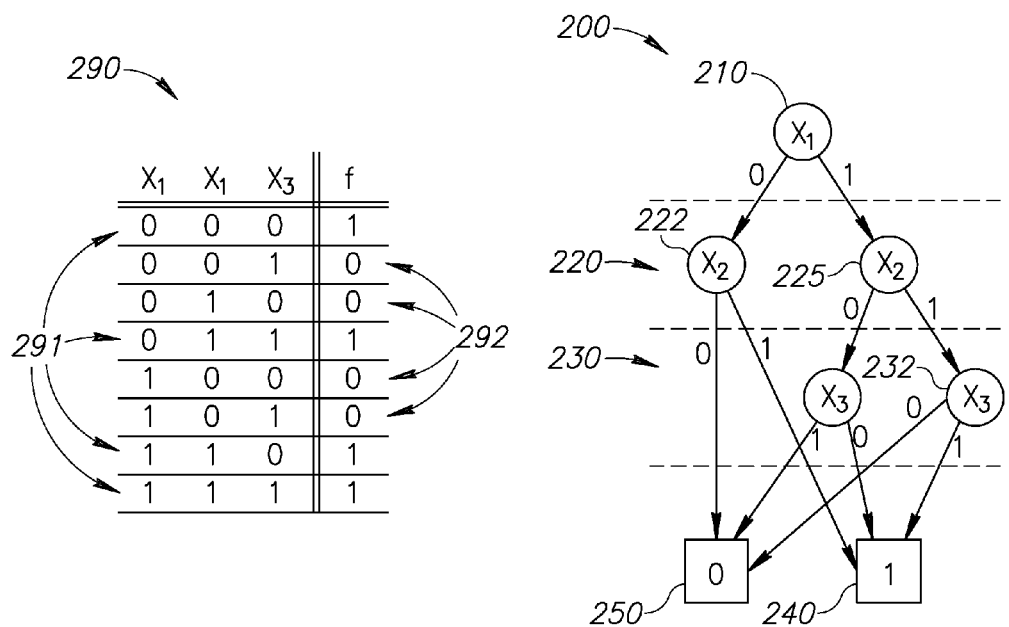
FIG. 2 shows an illustration of a Binary Decision Diagram (BDD), in accordance with some exemplary embodiments of the disclosed subject matter.

Referring now to FIG. 2 showing an illustration of a Binary Decision Diagram (BDD), in accordance with some exemplary embodiments of the disclosed subject matter. A BDD 200 for the binary function $(x_1 \wedge x_2) \vee (x_2 \wedge x_3) \vee (\neg x_1 \wedge \neg x x_2 \wedge \neg x x_3)$ is a compact data structure that provides for an assignment to the binary variables $x_1$, $x_2$, $x_3$ whether the binary function is evaluated to true (1) or false (0). As can be appreciated the BDD variables are binary variables. However, functional attributes that are not binary may be encoded using two or more BDD variables. For example, the variables $x_1$, $x_3$ may be associated with a single functional attribute having a domain of three or four alternative values.

In some exemplary embodiments The BDD 200 is a Directed Acyclic Graph (DAG), which consists of decision nodes and two terminal nodes 240, 250. Each decision node is labeled by a BDD variable and has two child nodes. The edge from a node to a child node represents an assignment of the variable to 0 or 1. The BDD 200 is ordered as different variables appear in the same order on all paths from the root. In some exemplary embodiments, the BDD may merge isomorphic sub-graphs and may exclude nodes whose children are isomorphic. Thus, the BDD is a compact version of a Binary Decision Tree from the same function.

A path from the root node 210 to the 1-terminal 240 represents a (possibly partial) variable assignment for which the represented Boolean function is true. As the path descends to a child from a node, then that node's variable is assigned a corresponding value.

BDD 200 orders the BDD variables. the root node, node 210, is associated with $x_1$, based on its value a sub-graph beginning in the second level 220 is selected (either node 222 or node 225). The second level 220 is associated with $x_2$. Based on its value a sub-graph beginning in the third level 230 is selected (e.g., node 232). The third level 230 is associated with $x_3$.

If at any time, the value of the function is constant and no addition information is needed, the BDD skips the next levels to the relevant constant value: one (terminal node 240) or zero (terminal node 250). For example, if $x_1$ is true (1) and $x_2$ is false (0), then no matter what the value of $x_3$ is, the function is evaluated to zero.

The order of the BDD variables may affect its size. Generally speaking the variables which are most useful to determine the constant value should be placed in high levels of the BDD (near the root) so as to allow the evaluation to be performed with as few edges as possible.

Referring to a truth table 290 of the same function of the BDD 200, rows 291 are rows for which the function is evaluated to true (1) and rows 292 are rows for which the function is evaluated to false (2). The BDD 200 provides the same information as the truth table 290 using a symbolic representation.

It will be noted that the BDD 200 may be used directly to perform calculations. For example, universal quantification of a variable may be performed, as well as existential quantification. Furthermore, Boolean operations, such as conjunction and disjunction, between functions may be performed directly using their BDDs.

It will be further noted that in the present disclosure and in the claims, the term Binary Decision Diagrams (BDDs) may refer to BDDs and variations thereof, such as for example Zero-suppressed Decision Diagrams (ZDDs), Multi-Terminal Decision Diagrams (MTDDs), Multi-Valued Decision Diagram (MDDs), and Binary Moment Diagrams (BMDs).

Generally, ZDDs are a version of BDDs where instead of introducing a node in the diagram when the result of the function is different between the 'true' and 'false' assignments to the corresponding variable, a node is introduced when the 'false' assignment to the corresponding variable results in evaluating the function to anything different than the constant 'false'. ZDDs are disclosed in A. Mishchenko, "An Introduction to Zero-Suppressed Binary Decision Diagrams", Proceedings of the 12th Symposium on the Integration of Symbolic Computation and Mechanized Reasoning, 2001, which is hereby incorporated by reference in its entirety.

Generally, MTDDs are an extension of BDDs where the function can evaluate to more than two values, i.e., have multiple terminal nodes. MTDDs are disclosed in M. Fujita et al., "Multi-Terminal Binary Decision Diagrams: An Efficient Data Structure for Matrix Representation", Formal Methods in System Design—FMSD, vol. 10, no. 2/3, pp. 149-169, 1997, which is hereby incorporated by reference in its entirety.

Generally, MDDs are a generalization of BDDs where the domains of the variables can be multi-valued. MDDs are disclosed in R. Brayton et al., "Multi-Valued Decision Diagrams Theory and Applications", Multiple-Valued Logic, 4 (1-2):9-62, 1998, which is hereby incorporated by reference in its entirety.

Generally, BMDs are a generalization of BDDs to include also domains over integers and real numbers. BMDs are disclosed in R. E. Bryant et al., "Verification of Arithmetic Circuits with Binary Moment Diagrams", Proceedings of the 32nd ACM/IEEE design automation conference, 535-541, 1995, which is hereby incorporated by reference in its entirety.

Figure 3:
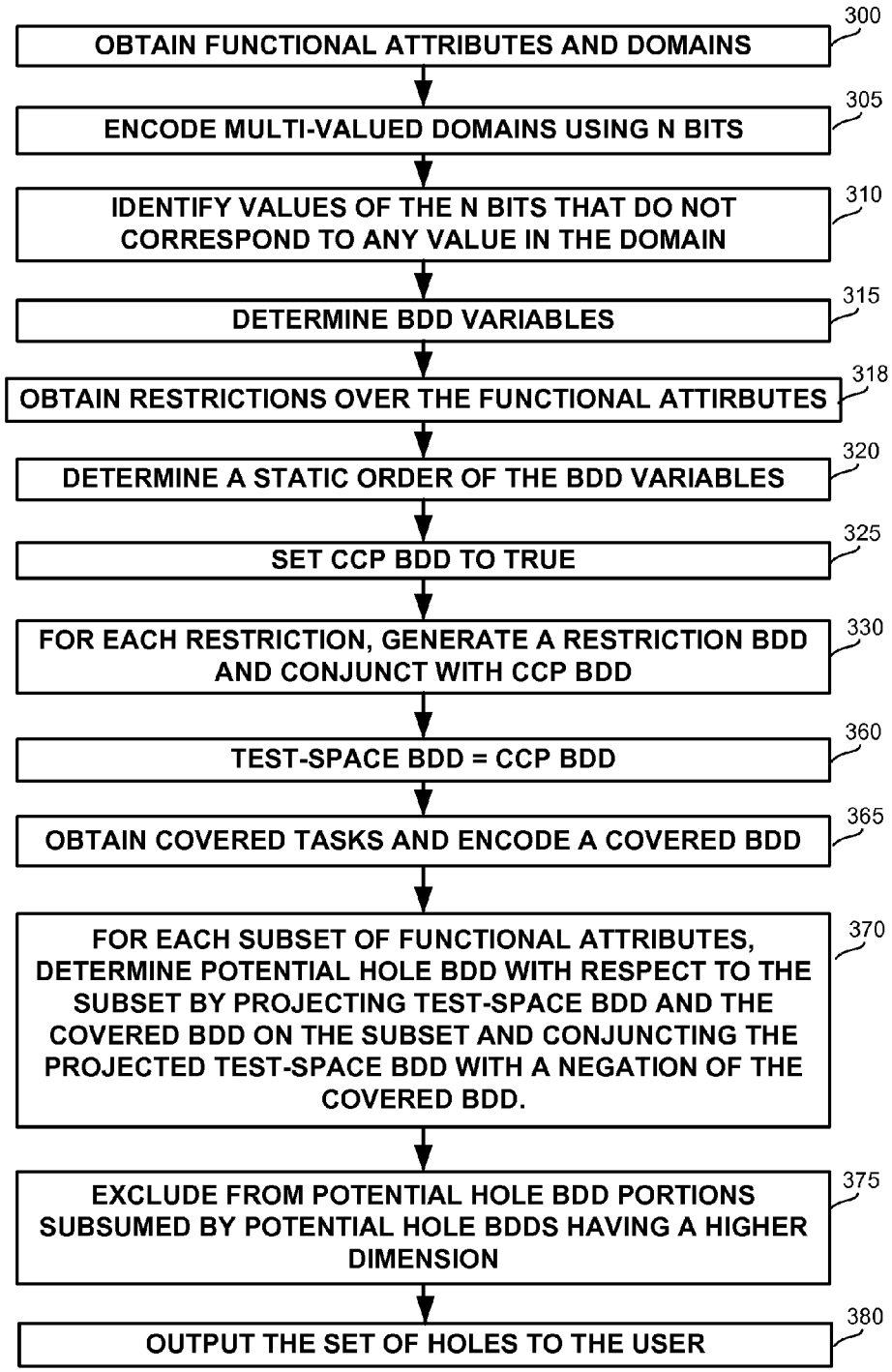
FIG. 3 shows a flowchart of a method of representing the Cartesian cross-product test-space using a BDD and utilization thereof, in accordance with some exemplary embodiments of the disclosed subject matter.

Referring now to FIG. 3 showing a flowchart of a method of representing the Cartesian cross-product test-space using a BDD and utilization thereof, in accordance with some exemplary embodiments of the disclosed subject matter.

In step 300, functional attributes and respective domains may be obtained. In some exemplary embodiments, the domain may be any finite domain comprising a finite number of alternative values. The functional attributes may be obtained from the user 140. The user 140 may define for each attribute a domain, either from predetermined domains, user-defined custom domains, or the like.

In step 305, multi-valued domains may be encoded using a number (n) of bits. The n bits may be encoded to n BDD variables such that the non-binary functional attribute is encoded using binary variables and therefore can be manipulated using BDDs. Each value of the domain may be encoded to different binary value using the n bits. In some exemplary embodiments, a multi-valued decision tree may be used to translate the n bits to the corresponding value of the domain. Other mapping methods may be used, such as for example, a dictionary data structure. Additionally or alternatively, an MDD may be used to represent the model instead of other variations of the BDD data structure.

In step 310, values of the n bits that do not correspond to any value in the domain may be identified. Bookkeeping may be performed when performing operations on the BDDs, such as the BDD 200, so as to make sure that the value of the BDD is not affected by the value of BDD for those n-bit values. For example, after determining the set of legal tasks (e.g., after step 330), the BDD may be limited only to valid domains (i.e., an assignment that does not encode to valid functional attribute would result in a false (0) value of the BDD). Additionally or alternatively, the limitation to valid domains may be performed in other steps, such as after step 325. In some exemplary embodiments, the limitation may be performed by conjuncting with a BDD representing only valid domains values (i.e., the BDD returns true only for assignments to the BDD variables which are validly encoded to domains). In some exemplary embodiments, limiting BDDs to valid domains may be performed in additional occasions, such as when negating a BDD representing legal tasks in order to determine the set of illegal tasks. As assignment to a valid domain is a constraint that all tasks must adhere to, both the legal tasks and illegal tasks adhere to this constraint. By negating the set of legal tasks, the result would include the illegal tasks and the assignments which are invalidly encoded. The assignments which are invalidly encoded may be excluded, such as for example by conjuncting with the BDD representing only valid domain values.

In step 315, BDD variables may be determined. A BDD variable may be allocated for each functional attribute with a binary domain. Functional attributes with multi-valued domains, may be associated with n BDD variables, corresponding to the n bits of step 305. In some exemplary embodiments, a functional attribute with a domain of two values may be translated into a binary domain of either 1 or 0, where one value is translated to 1 and the other to 0.

In step 318, one or more restrictions on the values of the functional attributes may be obtained. The user 140 may provide the restrictions. In some exemplary embodiments, the restrictions may be provided as a Boolean formula over the value of one or more functional attributes.

In step 320, a static order of the BDD variables may be determined. In some exemplary embodiments, the static ordering may be based on the number of times each functional attribute appears in restrictions. In some exemplary embodiments, BDD variables associated with the functional attribute that appears most in the restrictions may be ordered closely to the root. Alternatively, such BDD variables may be ordered close to the terminal nodes. In some exemplary embodiments, several BDD variables associated to the same functional attribute may be order so as to be proximate to one another. Additionally or alternatively, the static order may be based on an ordering of the functional attributes provided by the user 140.

In some exemplary embodiments, a dynamic reordering algorithm may be applied to modify the ordering of the BDD variables. The reordering may be performed heuristically, such as for example in response to the BDD reaching a threshold size. Additionally or alternatively, the static ordering may remain constant and unmodified throughout the processing of the method of FIG. 3.

In step 325 a BDD of the Cartesian Cross-Product test-space (CCP BDD) is initialized to true (1). Thereby, symbolically representing a test-space of the Cartesian product of the functional attributes.

In step 330, for each restriction, a BDD for the Boolean formula of the restriction is constructed and conjuncted with the CCP BDD. The BDD of the restriction is referred to as a restriction BDD. The restriction BDD is evaluated to false if and only if the restriction applies (i.e., the assignment of values to the functional attributes is illegal under the restriction). The restriction BDD may be determined directly based on the restriction or based on some intermediate representation thereof, such as a disjunctive normal form (DNF) of the restriction. The CCP BDD is conjuncted with the restriction BDD, thereby constraining the test-space represented by the CCP BDD so as to exclude coverage tasks that are illegal under the restriction. After all restriction BDDs are conjuncted with the CCP BDD, the CCP BDD symbolically represents the Cartesian cross-product test-space.

In step 360, the test-space is represented by the CCP BDD. The BDD representing the test-space may also be referred to as test-space BDD.

In step 365, covered coverage tasks may be obtained and based thereof a covered BDD may be encoded. Covered tasks may be obtained from a user, from a dynamic verification tool, from a trace of executed tests, from a test plan, or the like. Covered tasks may be encoded based on the functional coverage model and disjuncted with each other thereby encoding the covered BDD. As an example, it may be determined based on a trace, that tasks $t_1, t_2, \ldots, t_n$, are covered. The covered BDD, c, may be encoded by computing $c = t_1 \vee t_2 \vee \ldots \vee t_n$.

In step 370, potential hole BDDs may be computed. A potential hole BDD may be computed with respect to a subset of functional attributes, v, and represent uncovered combinations of values of the subset. In some exemplary embodiments, the potential hole BDD is computed with respect to a strict subset of the functional attributes. In some exemplary embodiments, potential hole BDDs are computed with respect to every strict subset of the functional attributes. In some exemplary embodiments, potential hole BDDs are computed with respect to every strict subset of the functional attributes (or to every strict subset of a predetermined subset of the functional attributes) having at most a predetermined number of functional attributes, such as every strict subset having at most three functional attributes, four functional attributes, or the like. Thereby, the potential holes that are examined are likely to be meaningful for a developer. Additionally or alternatively, coverage requirements comprising a set of tuples of functional attributes to be checked for coverage may be obtained (e.g., from a user, analytically generated, such as every tuple having up to four functional attributes, or the like) and a suitable BDD may be determined with respect to each such tuple.

A potential hole BDD may be computed by projecting the test-space BDD and the covered BDD on the subset of functional attributes, v. The projected test-space BDD may be conjuncted with a negation of the projected covered BDD, thereby computing the potential hole BDD which represents all combination of values of the subset v that are comprised by the test-space and that are not covered (phBDD=ts $\wedge \neg xc$, where phBDD is the potential hole BDD, ts is the projected test-space BDD and c is the projected covered BDD). It will be noted that in some exemplary embodiments, the above BDD operations are efficient and some of them may be performed in a time complexity of O(1).

In step 375, portions in a potential hole BDD may be excluded so as to determine a hole BDD. In some exemplary embodiments, the hole BDD comprises only portions that are not subsumed by other holes having higher dimension. In some exemplary embodiments, a potential hole BDD associated with a set of attributes having three functional attributes $(v_1, v_2, v_3)$ may be computed by obtaining all potential hole BDDs associated with any strict subset of the set of attributes (e.g., the set $(v_2, v_3)$, the set $(v_1)$, the set $(v_1, v_3)$, or the like) and excluding the relevant portions. For example, $hBDD_{v1,v2,v3} = ph_{v1,v2,v3} \wedge \neg x ph_{v1,v2} \wedge \neg x ph_{v2,v3} \wedge \neg x ph_{v1,v3} \wedge \neg x ph_{v1} \wedge \neg x ph_{v2} \wedge \neg x ph_{v3}$, where $hBDD_{v1,v2,v3}$ is BDD representing the holes with respect to the functional attributes $v_1, v_2, v_3$, and wherein $ph_V$ is a potential hole BDD or a hole BDD associated with the set of functional attributes denoted by V.

In some exemplary embodiments, the holeBDD may be computed by performing the following BDD operation: performing a following BDD operation:

$$holeBDD_V \wedge \bigcap_{\forall V': V' \subset V} \neg\, holeBDD_{V'},$$

wherein V and V' are subset of the functional variables, wherein V is the subset of variables associated with the potential hole BDD, wherein holeBDDV is a potential hole BDD associated with the subset V. Thereby, all holes having higher dimension are utilized to exclude already subsumed portions thereof from holes having a small dimension. It will be noted that utilizing the potential hole BDD of V' is substantially equivalent to utilizing the holeBDD for the purpose of this formula.

In some exemplary embodiments, holes may be computed in an order of their dimension, such that before computing a hole having the functional variables $v_1$ and $v_2$, all holes having higher dimension and comprising at least $v_1$ and $v_2$ have already been computed.

In step 380, the identified holes may be outputted to the user. In some exemplary embodiments, the user may then modify the testing so as to achieve a better coverage.

In some exemplary embodiments, instead of building one covered BDD that describes all covered tasks by disjunction, a plurality of BDDs may be built from the trace of other description of covered tasks. For each tuple of attributes that appear in the coverage requirements (i.e., interaction between functional attributes that are checked for coverage) a separate BDD may be built. Each such BDD may describe the tuples of values that are covered for the corresponding tuple of attributes. In such an embodiment, there is no need to create the global covered BDD and project it on each tuple of attributes when calculating the holes for this tuple of attributes.

Figure 4:
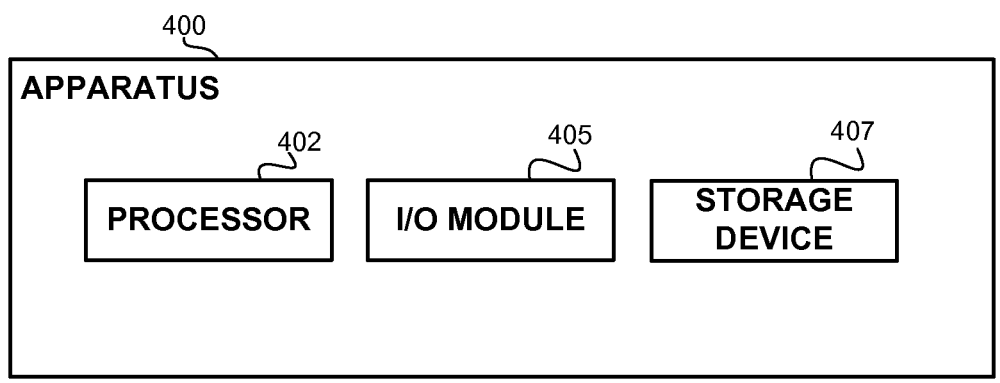
FIG. 4 shows a block diagram of components of an apparatus, in accordance with some exemplary embodiments of the disclosed subject matter.

Referring now to FIG. 4 showing a block diagram of components of an apparatus, in accordance with some exemplary embodiments of the disclosed subject matter. Apparatus 400 may be configured to represent a functional coverage test-space using a symbolic representation, such as a BDD. The apparatus 400 may be configured to perform methods such as disclosed in Fig. The apparatus 400 may provide the functionalities of the functional coverage model defining tool 110, the functional coverage analysis tool 120, the test planning tool 130 or the like.

In some exemplary embodiments, the apparatus 400 may comprise a processor 402. The processor 402 may be a Central Processing Unit (CPU), a microprocessor, an electronic circuit, an Integrated Circuit (IC) or the like. The processor 402 may be utilized to perform computations required by the apparatus 400 or any of it subcomponents.

In some exemplary embodiments of the disclosed subject matter, the apparatus 400 may comprise an Input/Output (I/O) module 405. The I/O module 405 may be utilized to provide an output to and receive input from the user 140. The I/O module 405 may provide for an interface to external modules, tools, devices, or the like. The I/O module 405 may be utilized to obtain information from the user. In some exemplary embodiments, the I/O module 405 may provide an output to the user 140 such as a report on determined coverage holes.

In some exemplary embodiments, the apparatus 400 may comprise a storage device 407. The storage device 407 may be a hard disk drive, a Flash disk, a Random Access Memory (RAM), a memory chip, or the like. In some exemplary embodiments, the storage device 407 may retain program code operative to cause the processor 402 to perform acts associated with any of the subcomponents of the apparatus

400. In some exemplary embodiments, the storage device 402 may retain the BDDs utilized by the apparatus.

In some exemplary embodiments, using BDD representation, functional coverage can be easily performed by a few efficient BDD operations. The following sets can be easily represented by BDDs:

1. All valid coverage tasks (The BDD legal)
2. All coverage tasks that are covered by the given tests (The BDD covered)
3. All holes for a given set of variables V (The BDD holes$_V$)

In some exemplary embodiments, for detecting all holes for a subset of variables V, a possible implementation is as follows:

1. Extract all candidate holes by projecting the BDD legal on the subset V
2. Extract all covered combinations of V by projecting the BDD covered on the subset V.
3. Conjunct the result of step 1 with the negation of the result of step 2. This will compute all value combinations from the set V that are not covered by the tests. A resulting BDD may be referred to as potential hole BDD.
4. Go over all smaller holes V' whose variables are contained in V, and conjunct the result of step 3 with the negation of BDD holes$_{V'}$. This will eliminate at once all holes for the variables in the set V that are contained in the holes for the variables in the set V'. The final result of step 4 is named holes$_V$.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
obtaining a functional coverage model of a System Under Test (SUT) defining all functional coverage tasks of the SUT, wherein the functional coverage model defining a functional coverage test-space with respect to functional attributes, wherein the functional coverage test-space includes the all functional coverage tasks of the SUT;
obtaining a set of covered functional coverage tasks;
encoding a covered Binary Decision Diagram (BDD) to represent the set of covered functional coverage tasks within the functional coverage test-space; and
manipulating, by a processor, the covered BDD to identify one or more coverage holes, wherein a coverage hole defines a set of functional coverage tasks in the functional coverage test-space, all having a same combination of values to a subset of the functional attributes, that are not covered by the set of covered functional coverage task.

2. The computer-implemented method of claim 1, wherein manipulating the covered BDD comprises:
determining a set of potential hole BDDs, wherein each potential hole BDD is associated with a different subset of functional attributes out of the functional attributes, wherein each potential hole BDD comprises all value combinations from the subset that are not covered; and
for each potential hole BDD, excluding a portion of the potential hole BDD that is subsumed by a different potential hole BDD, thereby providing the one or more coverage holes.

3. The computer-implemented method of claim 2, wherein excluding a portion of the potential hole BDD comprises:
for each strict subset of the subset associated with the potential hole BDD, determining a negation of a potential hole BDD associated with the strict subset; and
conjuncting all negations with the potential hole BDD thereby providing a hole BDD comprising holes for the subset of variables.

4. The computer-implemented method of claim 3, wherein excluding a portion of the potential hole BDD comprises performing a following BDD operation:

$$holeBDD_V \wedge \bigcap_{\forall V': V' \subset V} \neg holeBDD_{V'},$$

wherein V and V' are subset of the functional variables, wherein V is the subset of variables associated with the potential hole BDD, wherein $holeBDD_V$ is a potential hole BDD associated with the subset V.

5. The computer-implemented method of claim 1, further comprising reporting the coverage holes to a user.

6. The computer-implemented method of claim 1, wherein said manipulating the BDD comprises:
encoding a test-space BDD representing the functional coverage test-space;
projecting the test-space BDD on a combination of functional attributes;
projecting the covered BDD on the combination of functional attributes; and
performing a conjunction so as to determine a BDD representing: $ts \wedge \neg c$, wherein ts is the test-space BDD, wherein c is the covered BDD.

7. The computer-implemented method of claim 6, wherein said encoding the functional coverage test-space comprises determining a test-space BDD by:
initializing a BDD with a constant true value; and
for substantially each restriction defined by the functional coverage model:
building an additional BDD representing the restriction; and
conjuncting between the BDD and a negation of the additional BDD.

8. The computer-implemented method of claim 1, wherein said encoding comprises:
identifying a domain having more than two possible values;
based on the number of values in the domain, determining a number of bits for encoding the domain; and
encoding each value of the domain into a binary value having the number of bits.

9. The computer-implemented method of claim 1, wherein said encoding further comprises:
identifying a complementing set of binary values having the number of bits which do not correspond to any value of the domain;
with respect to manipulation of the BDD, ignoring the complementing set of binary values, so as to avoid having the complementing set of binary values to have effect on an outcome of the BDD manipulation.

10. The computer-implemented method of claim 1, wherein said encoding the covered BDD comprises encoding a plurality of covered BDDs, each representing set of covered coverage tasks with respect to a different subset of the functional attributes; and wherein said manipulating comprises:
with respect to each subset of functional attributes examined for coverage hole, conjuncting a negation of the covered BDD associated with the subset with a test-space BDD representing a projection of the test-space on the subset, thereby determining a potential hole BDD that is associated with the subset; and
manipulating the potential hole BDD to exclude portions that are subsumed by holes of higher dimensions.

11. A computerized apparatus having a computerized memory and a hardware processor, the processor being arranged to:
obtain a functional coverage model of a System Under Test (SUT) defining all functional coverage tasks of the SUT, wherein the functional coverage model defining a functional coverage test-space with respect to functional attributes, wherein the functional coverage test-space includes the all functional coverage tasks of the SUT;
obtain a set of covered functional coverage tasks;
encode a covered Binary Decision Diagram (BDD) to represent the set of covered functional coverage tasks within the functional coverage test-space; and
manipulate the covered BDD to identify one or more coverage holes, wherein a coverage hole defines a set of functional coverage tasks in the functional coverage test-space, all having a same combination of values to a subset of the functional attributes, that are not covered by the set of covered functional coverage task.

12. The computerized apparatus of claim 11, wherein manipulating the covered BDD comprises:
determining a set of potential hole BDDs, wherein each potential hole BDD is associated with a different subset of functional attributes out of the functional attributes, wherein each potential hole BDD comprises all value combinations from the subset that are not covered; and
for each potential hole BDD, excluding a portion of the potential hole BDD that is subsumed by a different potential hole BDD, thereby providing the one or more coverage holes.

13. The computerized apparatus of claim 12, wherein excluding a portion of the potential hole BDD comprises:
for each strict subset of the subset associated with the potential hole BDD, determining a negation of a potential hole BDD associated with the strict subset; and
conjuncting all negations with the potential hole BDD thereby providing a hole BDD comprising holes for the subset of variables.

14. The computerized apparatus of claim 13, wherein excluding a portion of the potential hole BDD comprises performing a following BDD operation:

$$holeBDD_V \wedge \bigcap_{\forall V': V' \subset V} \neg holeBDD_{V'}$$

wherein V and V' are subset of the functional variables, wherein V is the subset of variables associated with the potential hole BDD, wherein $holeBDD_{V'}$ is a potential hole BDD associated with the subset V.

15. The computerized apparatus of claim 11, wherein the processor is arranged to report the coverage holes to a user.

16. The computerized apparatus of claim 11, wherein manipulating the covered BDD comprises:
encoding a test-space BDD representing the functional coverage test-space;
projecting the test-space BDD on a combination of functional attributes;
projecting the covered BDD on the combination of functional attributes; and
performing a conjunction so as to determine a BDD representing: $ts \wedge \neg c$, wherein ts is the test-space BDD, wherein c is the covered BDD.

17. The computerized apparatus of claim 16, wherein encoding the functional coverage test-space comprises determining a test-space BDD by:
initializing a BDD with a constant true value; and
for substantially each restriction defined by the functional coverage model:
building an additional BDD representing the restriction; and
conjuncting between the BDD and a negation of the additional BDD.

18. The computerized apparatus of claim 11, wherein encoding the covered BDD comprises:
identifying a domain having more than two possible values;
based on the number of values in the domain, determining a number of bits for encoding the domain; and
encoding each value of the domain into a binary value having the number of bits.

19. The computerized apparatus of claim 11, wherein encoding the covered BDD further comprises:
identifying a complementing set of binary values having the number of bits which do not correspond to any value of the domain;
with respect to manipulation of the BDD, ignoring the complementing set of binary values, so as to avoid having the complementing set of binary values to have effect on an outcome of the BDD manipulation.

20. A computer program product, said computer program product comprising:
a non-transitory computer readable medium, in which computer instructions are stored, which instructions, when read by a computer, cause the computer to:
obtain a functional coverage model of a System Under Test (SUT) defining all functional coverage tasks of the SUT, wherein the functional coverage model defining a functional coverage test-space with respect to functional attributes, wherein the functional coverage test-space includes the all functional coverage tasks of the SUT;
obtain a set of covered functional coverage tasks;
encode a covered Binary Decision Diagram (BDD) to represent the set of covered functional coverage tasks within the functional coverage test-space; and
manipulate the covered BDD to identify one or more coverage holes, wherein a coverage hole defines a set of functional coverage tasks in the functional coverage test-space, all having a same combination of values to a subset of the functional attributes, that are not covered by the set of covered functional coverage task.

* * * * *